United States Patent [19]

Flocchini

[11] 4,022,158

[45] May 10, 1977

[54] AUTOMATED MILKING ASSEMBLY

[76] Inventor: Andrew J. Flocchini, 7050 Lakeville Highway, Petaluma, Calif. 94952

[22] Filed: Jan. 30, 1976

[21] Appl. No.: 653,818

Related U.S. Application Data

[62] Division of Ser. No. 510,328, Sept. 30, 1974, Pat. No. 3,973,520.

[52] U.S. Cl. .......................................... 119/14.14
[51] Int. Cl.² ........................................ A01J 7/00
[58] Field of Search ......... 119/14.05, 14.06, 14.07, 119/14.08, 14.14, 14.15, 14.16, 14.17

[56] References Cited

UNITED STATES PATENTS

| | | | |
|---|---|---|---|
| 3,189,002 | 6/1965 | Noorlander | 119/14.07 |
| 3,532,074 | 10/1970 | Svensson | 119/14.05 |
| 3,556,053 | 1/1971 | Padman et al. | 119/14.08 |

Primary Examiner—Hugh R. Chamblee
Attorney, Agent, or Firm—Townsend and Townsend

[57] ABSTRACT

An automated milking assembly is disclosed for moving a claw and teat cup assembly under a cow for milking and for automated retraction of the claw and teat cup assembly upon completion of milking. A vertical arm is constructed for articulation and vertical reciprocation. The arm is hinged at its upper end about a horizontal axis disposed transverse of the cow and carries at its lower end the milking claw and teat cups. When the cow is in position to be milked, the vertical arm reciprocates downwardly and articulates to an arcuate disposition wherein the claw and teat cup assembly is supported under the center of the cow adjacent the bag. Manual plugging of the teat cups occurs and milking is commenced. When the cow is through being milked, the vertical arm reciprocates upwardly and articulates to a vertical disposition wherein the claw and teat cups are supported to the side of the cow out of the walking path of the cow. Interruption of the milk flow is detected at a metering receptacle which has a periodically opening large aperture to prevent clogging of the metering device due to the inevitable presence of some solid particles in the milk. Upon interruption of milk flow, a signal is communicated to a circuit which integrates both the time interval of interruption of milk flow and the time interval of the resumption of milk flow. This time integration, when completed, triggers the automated retraction to assure retraction only when complete milking has occurred over a large part of any given sample of the cow population.

4 Claims, 6 Drawing Figures

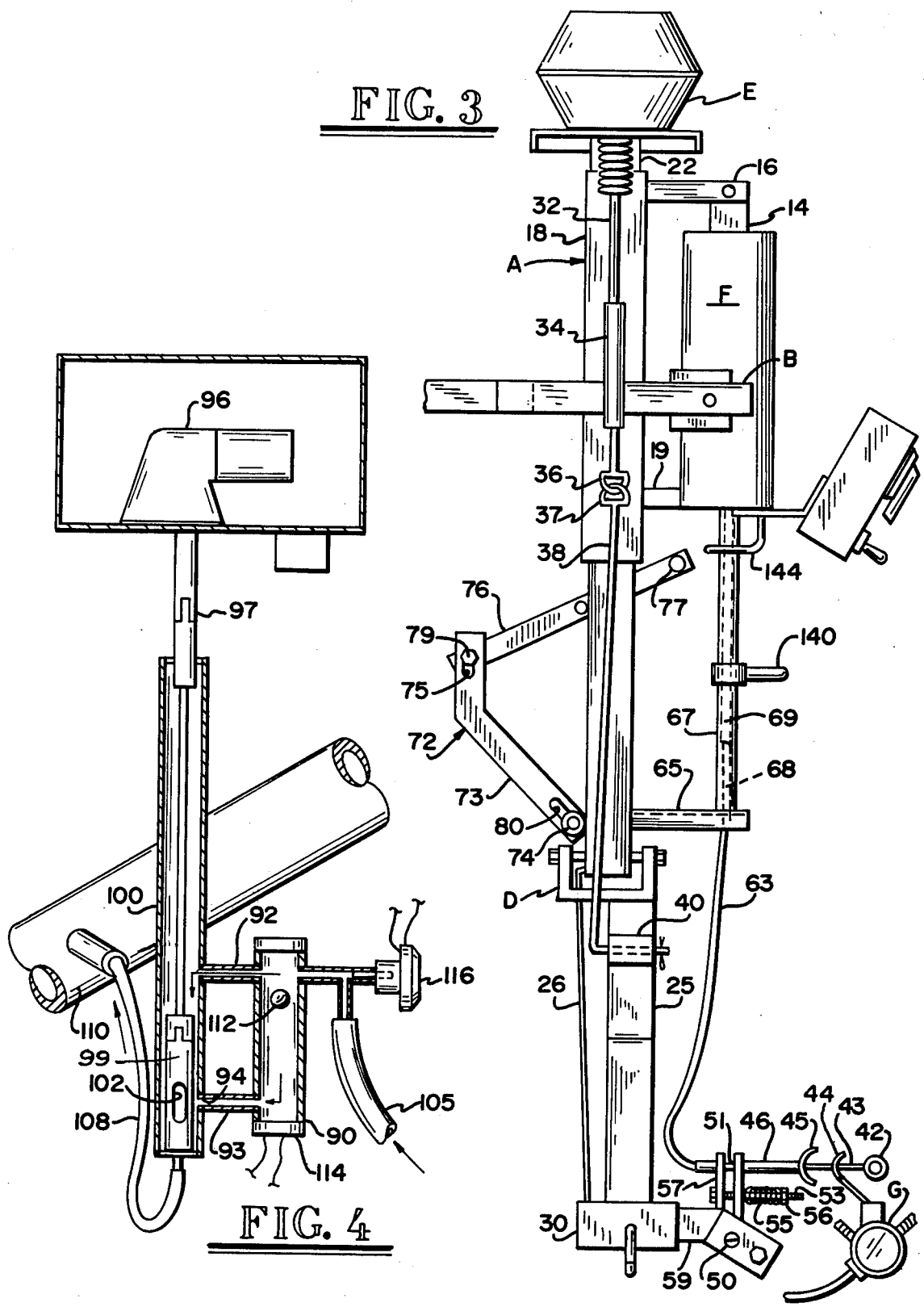

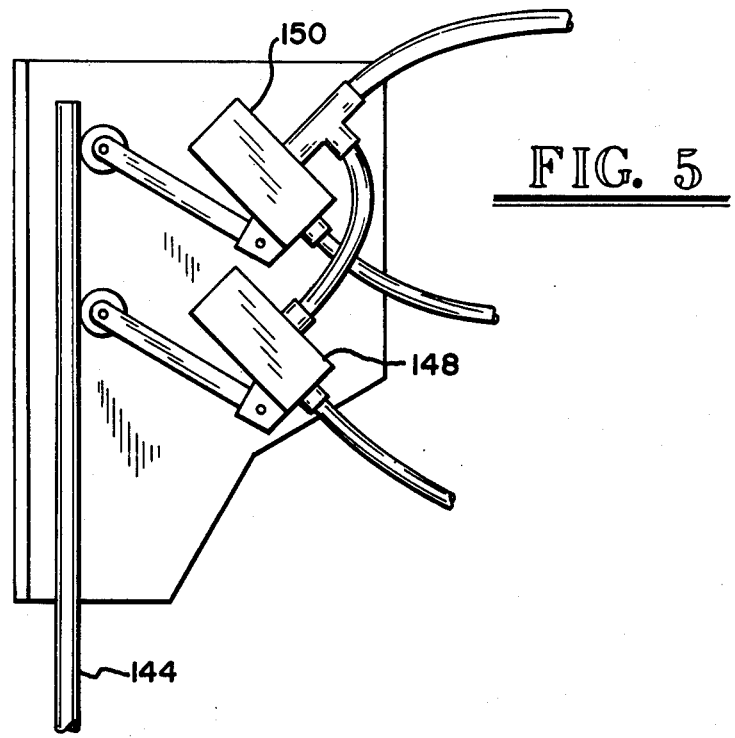
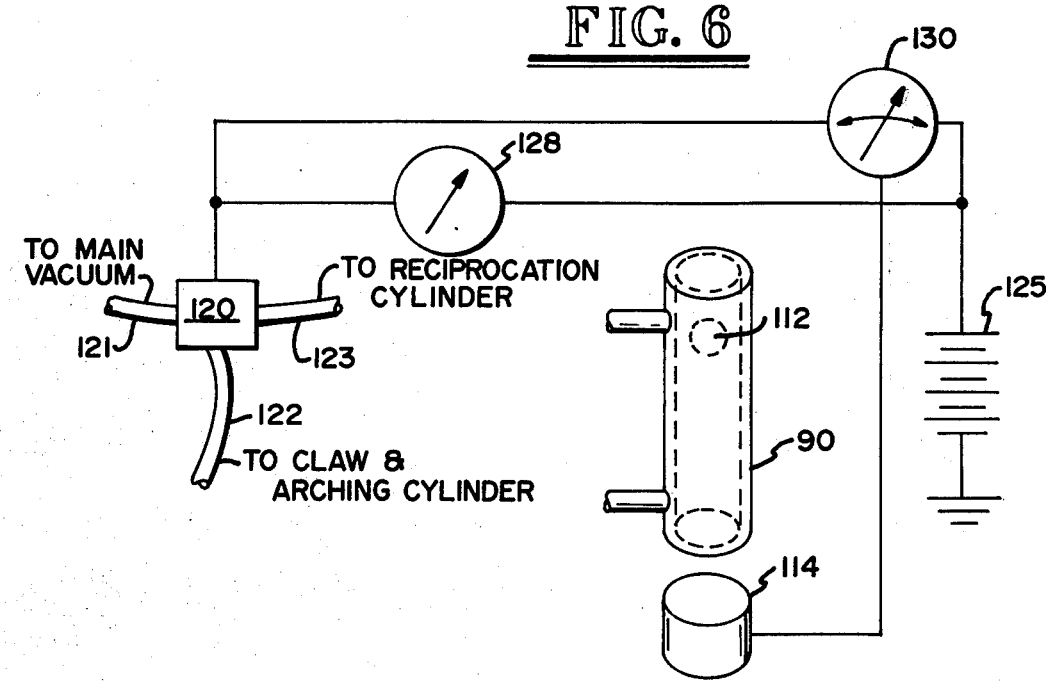

AUTOMATED MILKING ASSEMBLY

This is a division of application Ser. No. 510,328, filed Sept. 30, 1974 now U.S. Pat. No. 3,973,520.

This invention relates to automated devices for placing and retracting milking claw and teat cup assemblies to and from a milking position under a cow.

SUMMARY OF THE PRIOR ART

Heretofore, apparatus for pivoting teat cups and milking claws into and out of a milking position under a cow have included long arms pivoted about a vertical axis and moving in a horizontal plane.

Such machines with long horizontally moving arms have at least three separate disadvantages.

First, the pivot of such arms at the elevational level of the bag of a cow takes up too much room. Such arms cannot be conveniently placed in side by side relation with immediately adjacent cows. This results in the barn being enlarged, the cows not being in a natural side by side disposition, and finally, causes the milking attendant to have a walk much greater distances between adjacent cows that are being simultaneously milked. Inefficiency results.

Additionally, the motion of the supported assembly typically is not constructed to follow the natural animal motion of the cow. Typically, the walking path of the cow to and from a milking stall is along a straight line. The supported and moving path of the horizontally pivoting milking assembly is an arcuate path. With natural animal motion along its vertical walking path, the coupled milking claw and teat cup assembly is moved along its arcuate path. Separation of the teat cup assembly from the linear walking path along its arcuate support path inevitably results.

Further, such horizontal supports for milking claw assemblies must inevitably swing adjacent the hind legs of the cow. Since cows, when frightened, inevitably kick outwardly and to the side (rather than rearwardly), the kicking of such support assemblies by the cow occurs. Due to the size and strength of most cows, damage and injury can result.

SUMMARY OF THE INVENTION

An automated milking assembly is disclosed for moving a claw and teat cup assembly under a cow for milking and for automated retraction of the claw and teat cup assembly upon completion of milking. A vertical arm is constructed for articulation and vertical reciprocation. The arm is hinged at its upper end about a horizontal axis disposed transverse of the cow and carries at its lower end the milking claw and teat cups. When the cow is in position to be milked, the vertical arm reciprocates downwardly and articulates to an arcuate disposition wherein the claw and teat cup assembly is supported under the center of the cow adjacent the bag. Manual plugging of the teat cups occurs and milking is commenced. When the cow is through being milked, the vertical arm reciprocates upwardly and articulates to a vertical disposition wherein the claw and teat cups are supported to the side of the cow out of the walking path of the cow. Interruption of the milk flow is detected at a metering receptacle which has a periodically opening large aperture to prevent clogging of the metering device due to the inevitable presence of some solid particles in the milk. Upon interruption of milk flow, a signal is communicated to a circuit which integrates both the time interval of interruption of milk flow and the time interval of the resumption of milk flow. This time integration, when completed, triggers the automated retraction to assure retraction only when complete milking has occurred over a large part of any given sample of the cow population.

OBJECTS AND ADVANTAGES OF THE INVENTION

An object of this invention is to disclose a milking claw and teat cup support which reaches vertically down along one or the other side of a cow. According to this aspect of the invention, the vertical arm is pivoted about a horizontal axis which overlies and extends across the shoulders of the cow. The arm hangs down alongside the cow to support at its lower end the teat cups and milking claw.

An advantage of this invention is that it permits close side to side spacing of cows. Barn dimensions may be reduced. Cows may be placed in a close side to side milking disposition similar to their close side to side herding disposition. Attendants in charge of milking several cows at the same time have short distances over which to observe, monitor and manipulate the teat cup and claw assemblies.

A further object of this invention is to disclose an articulated vertical arm movable between two positions. The first position is a vertical disposition alongside of the cow out of the walking path of the cow. The second disposition is an arcuate disposition to pendulously move the milking claw and teat cup assembly under the center line of the walking path of a cow immediately adjacent the bag.

An advantage of this aspect of the invention is that the movement of the supported milking claw and teat cup assembly to and from a milking disposition does not require the large spatial area required by the horizontally moving arms of the prior art.

An additional advantage of this invention is that the teat cups are placed immediately adjacent the bag of the cow.

Yet another advantage of this aspect of the invention is that the path of the teat cups and claw to and from the milking disposition is outside of the kicking path of the cow. If the animal is frightened and kicks, impact with the arm and support milking claw and teat cups cannot occur.

Yet a further object of this invention is to disclose a vertical supporting arm which is capable of reciprocation to and from a milking position alongside of the cow. According to this aspect of the invention, when the teat cups are to the side of the cow and in the non-milking disposition, the arm reciprocates upwardly. When the arm is in the arcuate disposition under the center line of the cow, the arm reciprocates downwardly and places the claw immediately adjacent the bag of the cow. In either event, the claw and teat cups are supported at an elevation where their being dragged along the floor of the milking barn does not occur.

An advantage of this reciprocation is that the claw and teat cups are prevented from impact with the floor of the milking barn. A cleaner dairy results.

Yet another advantage of this reciprocation is that the necessity of using a horizontally moving arm pivoting about a vertical axis is avoided.

Yet another advantage of this reciprocation is that the movement of the teat cups to and from the milking position of the cow is the same as the movement of a human manually milking the cow to and from the cow's bag. This type of movement promotes a more natural and safe approach to the bag of a cow.

Yet another object of this invention is to disclose a milking claw and teat cup assembly which conforms to all possible movements of a cow. This confirmation of movement of the supported teat cups and milking claw minimizes the separation of the assembly from the bag of the cow.

One aspect of this feature of the invention is the ability of the assembly to accommodate fore and aft movement of the cow along the walking path of a cow. According to this aspect, the vertical arm is hinged at its top along a horizontal hinge axis which extends transverse and over the cow's shoulders. Movement of the cow towards and away from the milking stall results in pivot of the arm at its upper end about the hinge. Supported movement of the teat cups and milking claw assembly at its lower end in conformance with movement of the cow results.

Another aspect of this conforming movement is to place immediately under the center line of the cow a vertical hinge axis having a short arm support to the milking claw and teat cups. The milking claw and teat cups are provided with horizontal movement of the arm about the vertical hinge axis. When the cow shifts from side to side with a given motion, and the underlying bag or udder of the cow shifts pendulously with correspondingly side to side amplified motion, the supported teat cups and milking claw are capable of following the bag motion without decoupling.

Yet another aspect of the support of this invention being able to follow the natural movement of the cow, is the provision for some vertical movement in the short support arm about its vertical hinge immediately under the cow. Specifically, the arm is spring-supported with a bias that is opposite to and approximately equal to the weight of the teat cups and milking claw assembly. Vertical up and down movement of the arm can occur about a horizontal hinge axis which is directly under the center line of the cow. When the cow's bag moves upwardly and downwardly due either to the loss of milk from the bag or alternately the urination of the cow, the teat cups and milking claw assembly naturally follows such up and down movement.

Yet another aspect of the support of the teat cups and milking claw assembly of this invention is the ability of the support to accommodate cows of differing head to bag lengths. Specifically, the teat cups and claw assembly is supported at the end of the arm on a cable. The cable can be retracted towards and away from the end of the arm. This cable support and retraction has two distinct advantages.

As a first advantage of the cable, when the head to bag length of the cow is long, the teat cups and claw assembly can be pulled away from the arm to accommodate the unusual length of the cow. Conversely, when the head to bag distance is short, the teat cups can remain immediately adjacent the arm. Consequently, a variety of cow head-to-bag distances can all be accommodated.

A second distinct advantage of the cable support is that it allows an angular cant to the teat cups and claw assembly. Specifically, it often happens that the teats of a cow, four in number, all hang at different elevations. Even more commonly, as the bag empties, the elevation differential between various teats changes. The cable support between the teat cup and arm can turn and accommodate all elevations and elevation changes of the teat cups. The claw and protruding teat cups thus accommodate virtually every change in elevation due to the cow being milked.

A further object of this invention is to disclose an improved flow detector for metering the interruption of the flow of milk encountered at the end of milking. According to this aspect of the invention, a metering device is disclosed wherein a periodically opening large outflow aperture is used.

An advantage of this aspect of the invention is that a small, constantly opening metering outflow aperture is not used. Consequently, plugging of a small, metering outflow aperture due to the inevitable presence of solid particles in the milk of a cow cannot occur.

Yet another advantage of this aspect of the invention is that the possibility of over-milking of a cow with resultant tissue damage to the milk producing udder is minimized.

A further object of this invention is to disclose a timer sequence wherein the interruption of milk flow is time-integrated over a preselected interval. According to this aspect of the invention, a two-way timer is utilized. When milk flow is interrupted, the timer actuates the clock running in the first direction to decrease the time interval before the initiation of the arm retraction sequence. When milk flow is resumed, the timer reverses the clock and moves it to increase the time interval before the initiation of the arm retraction sequence. Retraction can only occur when the interruption-resumption milk flow pattern allows for complete time integration of the retraction sequence.

An advantage of this aspect of the invention is that cows have a large number of irregular flow patterns of their milk as the end of milking occurs. This pattern varies not only from cow to cow, but additionally with the time interval since the last pregnancy of the cow. The integrating time sequence herein assures automated retraction only when completed milking has occurred in a large part of any given sample of a cow population.

Yet another advantage of this time integrated sequence of this invention is that attendant supervision is minimized. Constant watching of the milk flow and even attendant identification of individual cows having irregular patterns at the end of milking is minimized. The automatic retraction sequence here shown only requires a small percentage of the cows being milked to have individual attendant monitoring during milk outflow.

Yet a further object of this invention is to disclose a retraction sequence which assures a comfortable and sanitary withdrawal of the claw and teat cup assembly. According to this aspect of the invention, the arm first reciprocates upwardly while it is maintained in an arcuate disposition. At this point, the vacuum to the teat cups is broken. Thereafter, the articulation of the arm is deactivated so that the arm pendulously swings from its arcuate disposition to a vertical disposition free and clear of the barn floor. The result is that the milking claw and teat cups either gravitationally swing away from the bag or alternately can be given a sharp blow of the attendant's hand and gravitationally away and out of the walking path of the cow.

Other objects, features and advantages of this invention will become more apparent after referring to the following specification and attached drawing in which:

FIG. 3 is a side elevation of the arm of this invention illustrating its working parts;

FIG. 4 is a side elevation shown partially in section of the milk metering apparatus of this invention;

FIG. 5 is a detail of the arm shown at Section 3—3 of FIG. 2 illustrating apparatus for breaking the vacuum at the bag as well as breaking the vacuum of the cylinder which maintains the arm in its articulated arcuate position; and, FIG. 6 is a schematic of the time integrating timer of this invention for initiating the retraction sequence.

In order to present a readable and readily understandable description of this invention, it is necessary to divide the description of this invention into discrete parts. First, applicant will describe the arm and its general working parts. Second, and thereafter, applicant will set forth the articulating functions of the arm. Third, the reciprocating function of the arm together with the claw support will be described. Fourth, the metering sequence will be set forth. Fifth and finally, the operating sequence will be described which, of necessity, will incorporate all of the previous descriptions.

DESCRIPTION OF THE ARM

The arm includes an upper vertical member A pivoted on a horizontal hinge B having its hinge axis extending substantially transverse of the cow at its upper end. The lower arcuate arm member C is articulated to and from an arcuate disposition about a joint D through force supplied by an articulating cylinder E. Upper vertical arm member A is reciprocated upwardly and downwardly through the action of a reciprocating cylinder F. At its lower end, the claw and teat cup assembly G is supported. Milk is drawn through the claw and teat cup assembly and passes to a metering assembly H. Metering assembly H in turn drives integrating timer J to activate automated retraction of the claw and teat cup assembly G. A manual timer K is used both to initiate initial movement of the claw and teat cup assembly G to the milking position as well as to provide for timed milking of the small sample of the cow population whose end of milk flow cannot be determined by the integrating timer J of this invention.

It will be appreciated by the reader that numerous references will be made hereinafter to the movement of the arm of this invention to and from the milking position. To assist the reader, FIG. 1 has been provided to illustrate the apparatus of this invention in a disposition away from the milking position. Similarly, FIG. 2 has been provided to illustrate the apparatus of this invention in the milking disposition.

Figure 1:
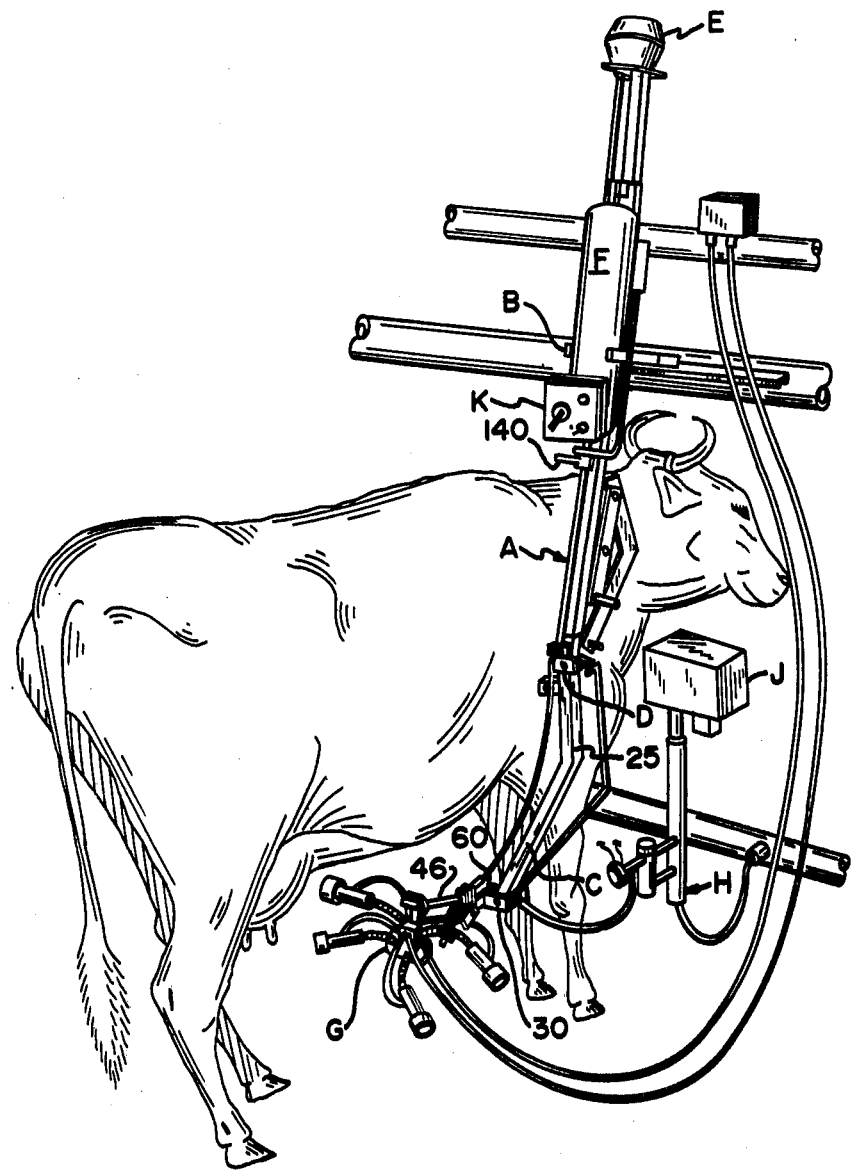
FIG. 1 is a perspective view of the milking apparatus of this invention illustrating a cow with the vertical arm here disposed along the right shoulder and behind the right fore leg of the cow and with the supported milking claw and teat cup assembly shown out of the walking path of the cow.

Referring to FIGS. 1 and 3, upper vertical arm member A is illustrated at horizontal hinge B. Horizontal hinge B pivots the arm at reciprocating cylinder F. Reciprocating cylinder F, at its upper end through rods 14 and 16, communicates to the upper end of outer sleeve 18. Reciprocating cylinder F is fastened to outer sleeve 18 at a lower rim fastener 19. It can clearly be seen that the horizontal hinge B pendulously supports the entire arm through reciprocating cylinder F in its vertical disposition.

Upper arm 22 reciprocates interiorly of outer sleeve 18. Both outer sleeve 18 and the upper arm 22 are typically square with outer sleeve 18 having an inside square dimension slightly exceeding the outside square dimension of upper arm 22 there within. Upper arm 22 exceeds in length outer sleeve 18. It has fastened at its upper end the articulating cylinder E and at its lower end it includes the articulating joint D.

Articulating joint D joins an arcuate arm member 25 to upper arm 22 about a hinge axis parallel to and along the side of the cow being milked. Articulating joint D includes a paralleling bar 26 (see FIG. 2). Paralleling bar 26 is rigidly pivoted to the lower portion of upper arm 22. This is at its upper end. At its lower end, paralleling bar 26 attaches to the outside portion of two axes pivot 30 which provides for the support of the claw and teat cup assembly G.

ARTICULATION

The articulation of the apparatus of this invention can be easily understood. Articulating cylinder E has its cylinder rod 32 extending downwardly through a rod guide 34 fastened to the outside of outer sleeve 18. It terminates in a link 36. Link 36 couples to a second rod 38 through second link 37, which link extends downwardly to the articulating joint D. This rod connects to a pivot 40 on the inside of arcuate lower arm member 25 just beyond articulating joint D.

Typically, the articulating cylinder is actuated to retract its cylinder rod 32. This pulls arcuate lower arm member 25 through second rod 38 inwardly and towards the cow. At the same time, paralleling bar 26 maintains pivot 30 in a parallel disposition. Accordingly, the movement of the claw and teat cup assemblies to and from a parallel position can be actuated through articulating cylinder E.

RECIPROCATION

It should be appreciated that the reciprocation of the arm upwardly and downwardly is integral to the grasping of the claw and teat cup assembly G. Accordingly, the best way of understanding this aspect of the invention is to commence with the description of the grasping of the claw and teat cup assembly G and to describe the apparatus upwardly and toward reciprocating cylinder F. After such a description has been made, the reciprocation of this apparatus can be explained.

Typically, pawl 42 is supported at the end of a cable 43. A semi-cylindrical cable receptor 45 limits the inward movement of pawl 42 as it is pulled by cable 43. Typically, claw and teat cup assembly G is provided with semi-cylindrical surface 44 that extends upwardly and angularly out from the claw and teat cup assembly G. This semi-cylindrical surface 44 captures pawl 42 there within when the claw and teat cups are pulled away from the support. This same semi-cylindrical surface 44 is captured on both sides (by pawl 42 on the inner side and by the semi-cylindrical cable receptor 45 on the opposite side) when pawl 42 is pulled on cable 43 towards the semi-cylindrical cable receptor 45.

Semi-cylindrical cable receptor 45 is supported on a short pivot tube 46. Pivot tube 46 has two axes of movement. A first axis of movement is provided about a horizontal axis transverse of the length of the cow about pivot 30. A second axis of movement is provided vertically through pivot 30.

Regarding the first axis of movement, hinge axis 50 has hinge arm 51 extending upwardly to the rear surface of pivot tube 46. Hinge arm 51 is perforated at a distance removed from hinge axis 50 and has a rod 53 passing there through. Rod 53 has disposed over its surface a tensioned coil spring 55 captured between a nut 56 and hinge arm 51. Cable 43 passes through concentrically bored apertures in hinge arm 51 and in arm 57 welded to the end of horizontal arm 59.

Assuming the cable 43 is relaxed and pawl 42 pulled away from semi-cylindrical cable receptor 45 through movement of the milking claw and teat cup assembly G, movement of hinge arm 51 about the horizontal hinge axis 50 can occur. Such movement will be opposed by compression bias in tensioned coil spring 55. Although some downward movement of the supported teat cup and claw assembly G can occur, it will be opposed by the adjustable bias in tensioned coil spring 55. Thus, some movement of this assembly can occur about a horizontal axis transverse of the cow at pivot 30.

As has been previously emphasized, it is also necessary to provide for some horizontal movement of pivot tube 46 about a vertical axis supported at pivot 30. According to this aspect of the invention, pivot 30 supports a horizontal pin and hinge 60 at its inner end. Horizontal pin and hinge 60 pivot tube 46 about a vertical axis directly under the cow's belly. Thus, the claw and teat cup assembly G is capable of following side to side movement with respect to the bag of the cow.

Cable 43 passes through pivot tube 46, hinge arm 51, arm 57, and interiorly of outer cable casing 63. Outer cable casing 63 passes upwardly of and is fastened rigidly to bar 65 below the lower end of reciprocating cylinder F. Bar 65 is fastened at both of its ends. It is fastened to upper arm 22 at its inner end. It is fastened to the outer reciprocating piston rod 67 of reciprocating cylinder F at its outer end.

The reciprocating cylinder F can be easily understood. This cylinder includes an inner reciprocating member 68 and an outer reciprocating member 69. Inner reciprocating member 68 connects to the end of cable 43. When reciprocating cylinder F draws inner reciprocating member 68 upwardly, an upward reciprocation of the arm occurs.

Understanding this upward reciprocation can be best understood by discussing the view and disposition of the arm shown in FIG. 3 as it progresses towards the configuration of the apparatus originally illustrated in FIG. 1. Broadly, upon retraction of the inner reciprocating member 68, cable 43 draws pawl 42 interiorly of the semi-cylindrical cable receptor 45. As has been previously explained, this draws the teat cup and claw assembly G rigidly to the outer end of pivot tube 46 through capture of semi-cylindrical surface 44.

When this occurs, tensioning of the apparatus will next occur between hinge arm 51 and rigid arm 57. Specifically, hinge arm 51 will be drawn in confronting juxtaposition to rigid arm 57. Pivot tube 46 will pivot to a horizontal disposition with respect to pivot 30. Any movement about its horizontal pivot axis will be taken up.

As inner reciprocating member 68 continues to contract, all movement of cable 43 through pivot tube 46 and outer cable casing 63 which can occur, will have occurred. Therefore, bar 65, through compression of the outer cable casing 63, will draw bar 65 upwardly and toward reciprocating cylinder F.

When this occurs, upper arm 22 will move upwardly from the disposition shown in FIG. 3 to the disposition shown in FIG. 1. This will follow because bar 65 is inevitably drawn closer to reciprocating cylinder F. This movement will continue until the vertical arm is in the disposition illustrated in FIG. 1.

It has been found that the bag to barn floor distance between various cows varies considerably. This being the case, it has been found necessary to reciprocate the arm partially upwardly even though the teat cup and claw assembly G is positioned under and centrally up the cow. To enable such positioning, an over center crank mechanism 72 is employed. At its lower end, over enter crank mechanism 72 includes a first arcuate bar 73 fastened at a pivot 74 having an elongated aperture at the lower end of upper arm 22. This first arcuate bar 73 includes a second elongate aperture 75 at its upper end. An elevating crank handle 76 is pivoted medially to the lower end of outer sleeve 18. At one end it is provided with a crank handle 77. At the opposite end it is provided with a pin 79 that slides interiorly of the second elongate aperture 75.

Operation of the over center crank mechanism 72 is easily understood by those having skill in mechanical arts. When crank handle 77 is rotated arcuately and downwardly (see FIG. 3), pin 79 at the end of elevating crank handle 76 causes the first arcuate bar 73 to draw up upper arm 22. This motion continues until elevating crank handle 76 is passed center. When elevating crank handle 76 is passed center, the downward gravitational bias of upper arm 22 will cause elevating crank handle 76 to remain slightly past center with the result that the crank mechanism is supported in a past center relationship.

When downward movement is desired, reciprocating cylinder F is first fully retracted. Elongate slot 80 in combination with the second elongate aperture 75 moves crank handle 77 in a return movement over center. Thereafter, when the vacuum of reciprocating cylinder F is relaxed, the over center crank mechanism 72 opens, allowing downward reciprocation of upper arm 22 interior of outer sleeve 18.

METERING SEQUENCE

Having fully understood and discussed the articulation and reciprocation of the vertical arm, attention can now be directed to the detection of the interruption of milk flow.

Referring to FIG. 4, a milk chamber metering apparatus is disclosed. A cylindrical chamber 90 is illustrated having a top conduit 92 communicating to an overflow, and a bottom conduit 93 communicating to a periodically opening aperture 94.

Periodically opening aperture 94 can be made to operate in any given number of ways. For example, a piston can be made to reciprocate in front of an aperture, opening the aperture on withdrawal, and closing the aperture upon penetration. Alternately, and preferably, a motor 96 having a rotating output shaft 97 can be coupled to a hallow rotating cylinder 99. Rotating cylinder 99 can be rotated interiorly of an outer cylinder 100. An elongate aperture 102 can be made in the side wall of the rotating cylinder 99 and periodically come into registry with corresponding aperture 94 in the side wall of outer cylinder 100.

Assuming that milk flow comes inwardly from the teat cup and claw assembly G through a plastic hose 105, it is drawn interiorly of the cylindrical chamber 90. From cylindrical chamber 90, escape of milk can occur along two discrete paths.

The first of these paths is the cylindrical chamber 90 which periodically opens as the elongate aperture 102 of the rotating cylinder 99 periodically registers with the bottom conduit 93 at the bottom of cylindrical chamber 90. Alternately, milk outflow can occur through top conduit 92 interiorly and centrally of the rotating cylinder 99 to the milk outflow tube 108 to the main milk manifold 110.

A metal float 112 is supported on the surface of the liquid milk and moves towards and away from a metal detector 114 positioned at the bottom of cylindrical chamber 90. This movement occurs with the movement of the level of milk in the cylindrical chamber 90.

Operation of the apparatus can be readily understood. Specifically, as milk flow is reduced, the periodic opening of bottom conduit 93 through elongate aperture 102 will cause the level of milk in the cylindrical chamber 90 to fall. As this level of milk falls, the metal float 112 will move increasingly toward metal detector 114. When the metal float 112 reaches the bottom of cylindrical chamber 90, it will come into contact with metal detector 114. The circuit of the metal detector will be activated and a detection of the interruption of milk flow will be sensed at once.

Conversely, as milk flow is either initiated or resumed, the periodic opening of bottom conduit 93 through elongate aperture 102 will be insufficient to cause the level of milk in the cylindrical chamber 90 to fall. As the level of milk rises, the metal float 112 will move increasingly away from metal detector 114. When metal float 112 moves away from the metal detector 114, the circuit of the metal detector will be opened and the detection of the resumption of milk flow will be sensed.

The metering sequence of the apparatus of FIG. 4 generates a flow, no flow alternative signal through the output of the metal detector. The utilization of this signal to produce the integration of the interruption of milk flow to ultimately result in retraction of the apparatus of this invention can be best understood with respect to FIG. 6.

Referring to FIG. 6, a three-way solenoid 120 is shown. Three-way solenoid 120 communicates to the main vacuum through conduit 121. When the solenoid is energized, the vacuum is communicated from conduit 121 to pass to the milking claw and arching cylinder through conduit 122. When the solenoid is deenergized, the vacuum communicates to conduit 123 to the reciprocating cylinder F.

Energizing of the three-way solenoid 120 can occur along two discrete paths from a power source 125 to the three-way solenoid 120. The first path is through an ordinary timer 128. The second path is through an integrating clock 130. Closure of the circuits by the actuation of either of these timers results in vacuum being communicated to the articulating cylinder E and the teat cup and claw G with vacuum being taken from the reciprocating cylinder F. The result is the movement of the apparatus of this invention from the disposition shown in FIG. 1 to the disposition shown in FIG. 2.

Conversely, when the circuits of both the timer 128 and the integrating clock 130 are open, as when both timers have run their timed course, the vacuum is released from the claw and articulating cylinder and communicated to the reciprocating cylinder. The result is that the apparatus moves from the disposition of FIG. 2 to the disposition shown in FIG. 1 wherein the assembly moves outside of the walking and milking path of the cow.

Before discussing operation of the timer sequence, it is necessary to understand fully the function of the integrating clock 130. An example of the specifics of the operation of integrating clock 130 can help. Specifically, it has been found preferable to use an eight-second timing interval at integrating clock 130. When metal float 112 moves away from metal detector 114, integrating clock 130 will first close the circuit between power source 125 and three-way solenoid 120. Thereafter, integrating clock 130 will continue to run for an eight-second period. After eight seconds, the clock will have reached the maximum time interval from a position wherein the circuit, through the clock, opens between the power source 125 and the three-way solenoid 120.

When a milk flow interruption occurs, say for a period of approximately four seconds, integrating clock 130 will commence to run towards the position wherein it will open the circuit between the power source 125 and the three-way solenoid 120. Assuming at the end of a four-second interval, milk flow again resumes. Metal float 112 moves away to open the circuit of the metal detector 114. Integrating clock 130 will again commence running away from the position in which it can open the circuit between the power source 125 and the three-way solenoid 120. Thus, if milk flow recommences for a period of two seconds and then ceases, integrating clock 130 will be 6 seconds away from a position wherein the de-energization of three-way solenoid 120 occurs. Thus, it can be clearly seen that the interruption of milk flow and the resumption of milk flow is time integrated at integrating clock 130 to a preselected cumulative interval of time, preferably eight seconds.

It should be noted that integrating clock 130 is a standard item of manufacture. Specifically, such an integrating clock is manufactured by the Amperite Company of Union City, New Jersey, and sold under the description Model No. 26-NO-10.

Figure 2:
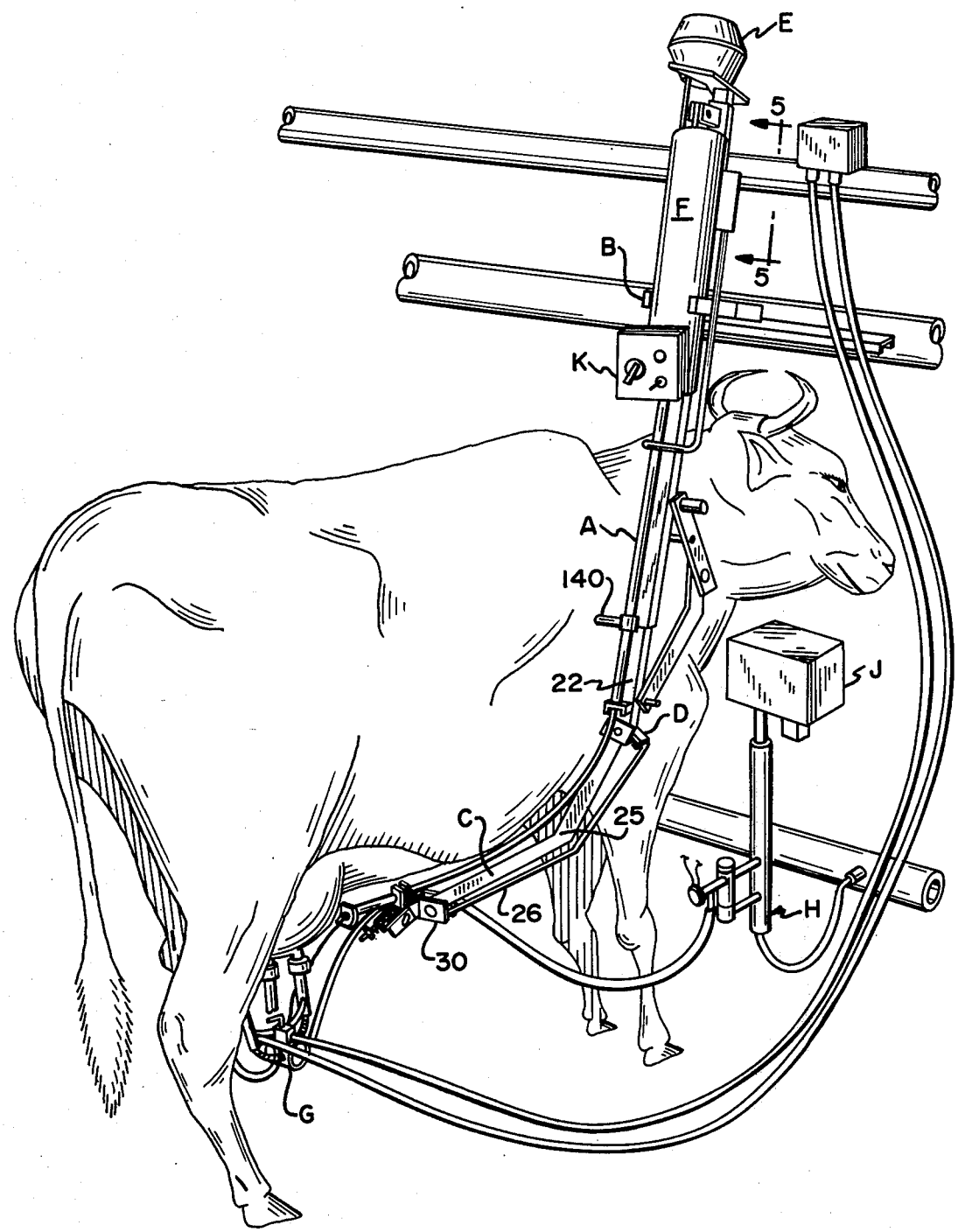
FIG. 2 is a slightly enlarged perspective view of the milking apparatus of this invention here illustrating the arm in a reciprocated and lowered position with the arm articulated to a vertical position and the claw and teat cup assembly plugged into the bag of the cow for milking.

Having understood the operation of the integrating clock mechanism, one additional piece of apparatus need be described. Referring to FIG. 2 specifically, it will be noted that a manual adjustment handle 140 is attached to the outer reciprocating member 69 of the reciprocating cylinder F. This manual adjustment may be pulled away from the reciprocating cylinder F to release cable 43 and pawl 42 from the semi-cylindrical cable receptor at the end of 246. Conversely, and when reciprocating retraction of the cylinder occurs, manual adjustment handle 140 moves upwardly and comes into contact with a cylinder rod rider 144 which rides about the outside surface of outer reciprocating member 69 of reciprocating cylinder F. When manual adjustment handle 140 contacts cylinder rod rider 144, two releases occur in the vacuum system. These may best be understood with reference to FIG. 5.

Referring to FIG. 5, cylinder rod rider 144 first deactivates and breaks a vacuum to the milking claw and teat cup assembly through a valve 148. This causes the vacuum at the teat cups of the cow to be broken.

Upon further upward movement, the vacuum to the articulating cylinder E is broken through a valve 150. Thus, the vacuum to the cow's teats at the teat cups will first be interrupted. Thereafter, the arching of the disclosed apparatus at the articulating joint D will next be interrupted. The claw and teat cup assembly G will either pendulously swing out of the walking path of the cow, or alternately, by a relatively sharp blow can be knocked away by the attendant from the bag of the cow. Painless and comfortable separation of the apparatus from the bag of the cow is assured.

Reference has previously been made to the over center crank mechanism actuated at crank handle 77 to partially reciprocate upwardly the arm of this invention so that claw and teat cup assembly G can be held proximate the bag of cows having relatively high elevation from a barn floor. It should be noted that the crank handle 77 and associated mechanism is actuated to move the arm by manual adjustment upwardly only a portion of its length. Manual adjustment handle 140, during such movement, does not and cannot contact cylinder rod rider 144 to break the vacuum to either the teat cup and claw assembly G through valve 148, or the articulating cylinder E through valve 150.

OPERATING SEQUENCE

Having described the discrete operating portions of this invention, the operation now can be readily understood.

Typically, cows are held in a milking station by three apparatus well known in the prior art and not here shown to eliminate confusion. First, there is usually a guillotine feeding trough. In the feeding trough, the cow is fed by inserting its head through paired bars having a scissors-like motion one with respect to another towards and away from the head of the cow in the trough. When the cow's head is in the trough, the bars partially close. This closure maintains the cow's head in the trough and prevents the animal from retracting its head and moving away from the feeding stall.

Second, there are side bars on either side of the cow's walking path. These side bars extend outwardly and parallel to the disposition of the cow and serve to define a walking path to and from the milking station. Movement of the cow to one side or the other side of the walking path is blocked by the bars.

Typically, the cow readily moves upon release to a milking station for feeding at the guillotine gate. Upon release of the cow, the apparatus of this invention is in the disposition shown in FIG. 1 wherein bars on either side confine the walking path of the cow to the feeding trough along a well defined and linear path. As has heretofore been emphasized, the milking claw and teat cup assembly G is supported well out of the walking path of the cow.

When the cow is held to the milking station by the conventional guillotine gate, the attendant turns the manual timer 128. Timer 128 energizes three-way solenoid 120 and communicates a vacuum to the claw and arching cylinder assembly. Vacuum is released on the reciprocating cylinder F. Conduit 122 immediately and gravitationally slides downwardly, interiorly of casing 118. At the same time, the articulating cylinder E contracts and causes lower arcuate arm member 25 to move to the arched position wherein the claw and the teat cup assembly G is held immediately under the bag of the cow.

Assuming that the head to bag distance of the cow is relatively long, the attendant pushes down on the manual adjustment handle 140. This causes cable 43 to move away from the end of pivot tube 46 and semicylindrical cable receptor 45. Thereafter, the claw and teat cup assembly G is plugged into the teats of the cow and milking is commenced.

Typically, the time interval of timer 128 is such that an ample time period for commencing milking is permitted. When milk commences to flow, metal float 112 moves away from metal detector 114. Integrating clock 130 moves away and the circuit between power source 125 and three-way solenoid 120 is closed.

When the end mailing occurs, integrating clock 130, through the time integrating sequence previously described, moves to a position wherein the circuit between the power source 125 and the three-way solenoid 120 is open. When this occurs, vacuum is released from the claw and articulating cylinder and communicated to the reciprocating cylinder F through conduit 123. At this time, retraction occurs. Retraction continues as pawl 42 is drawn to capture the claw and teat cup assembly G against the outer end of pivot tube 46 of semi-cylindrical cable receptor 45. Upper arm 22 is then drawn upwardly of outer sleeve 18 by further motion of the reciprocating cylinder F. Finally, cylinder rod rider 144, contacted by manual adjustment handle 140, causes the vacuum to be broken first at the teat cups and then at the articulating cylinder. Decoupling of the claw and teat cup assembly G from the teats of a cow occurs.

It shold be understood that the invention herein described will admit of a number of modifications. For example, the arm disclosed herewith does not have to be used with either the integrating timer, or alternately, the milk metering device of this invention. The converse is also true. Likewise, other modifications may be made without departing from the spirit and scope of this invention.

I claim:

1. A milking flow detector for measuring the outflow from a milking attachment to a cow, said detector comprising: a receptacle having an inflow conduit for receiving milk and first and second outflow conduits, said inflow communicated to a milking attachment to said cow, said first outflow communicated to a milk receiving manifold substantially without obstruction, said second outflow communicated to said milk receiving manifold, said second outflow conduit defining a large aperture through which the milk must pass; and means to periodically open and close said large aperture to discharge milk from said receptacle at a preselected rate.

2. The invention of claim 1 and including a cylindrical pipe communicated to said receptacle through an opening adjacent the bottom of said receptacle, said pipe extending upwardly to the top of said receptacle adjacent the top of said receptacle; said first outflow communicating through the top of said pipe; said second ouflow comprising a hole in the sidewall of said pipe adjacent the bottom of said receptacle; and, means operative interiorly of said pipe for opening and closing periodically said hole within said pipe.

3. The invention of claim 2 and wherein said opening and closing means comprises a member concentrically mounted within said pipe for periodically moving from an obstructing position to an opening position with respect to said hole in said pipe.

4. The invention of claim 3 and wherein said obstructing member rotates interiorly of said pipe.

* * * * *